June 21, 1966 R. S. WEBB 3,257,306
ELECTROLYTIC MACHINING APPARATUS
Original Filed Aug. 28, 1959 3 Sheets-Sheet 1
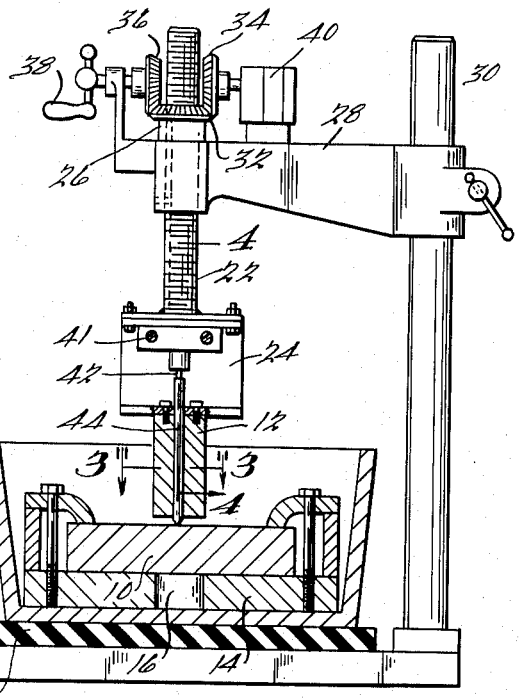
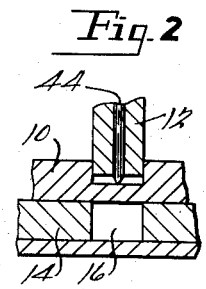
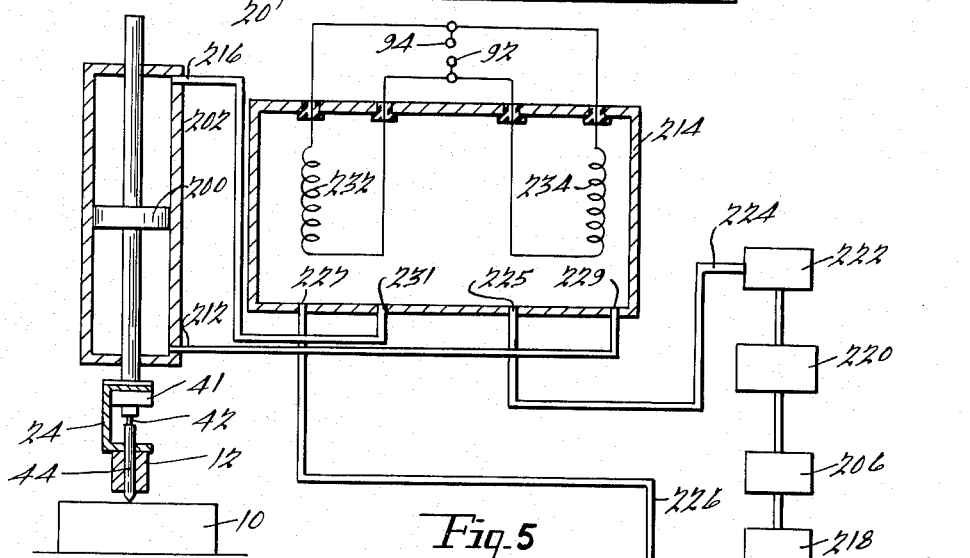
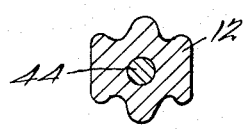
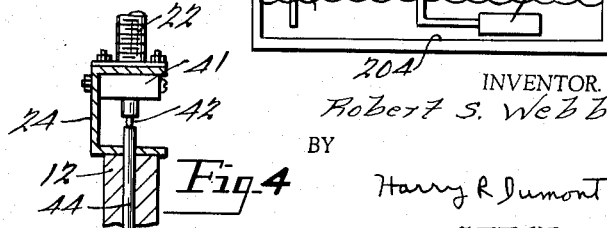
INVENTOR.
Robert S. Webb,
BY
Harry R Dumont
ATTORNEY.

INVENTOR.
Robert S. Webb
BY
Harry R Dumont
ATTORNEY.

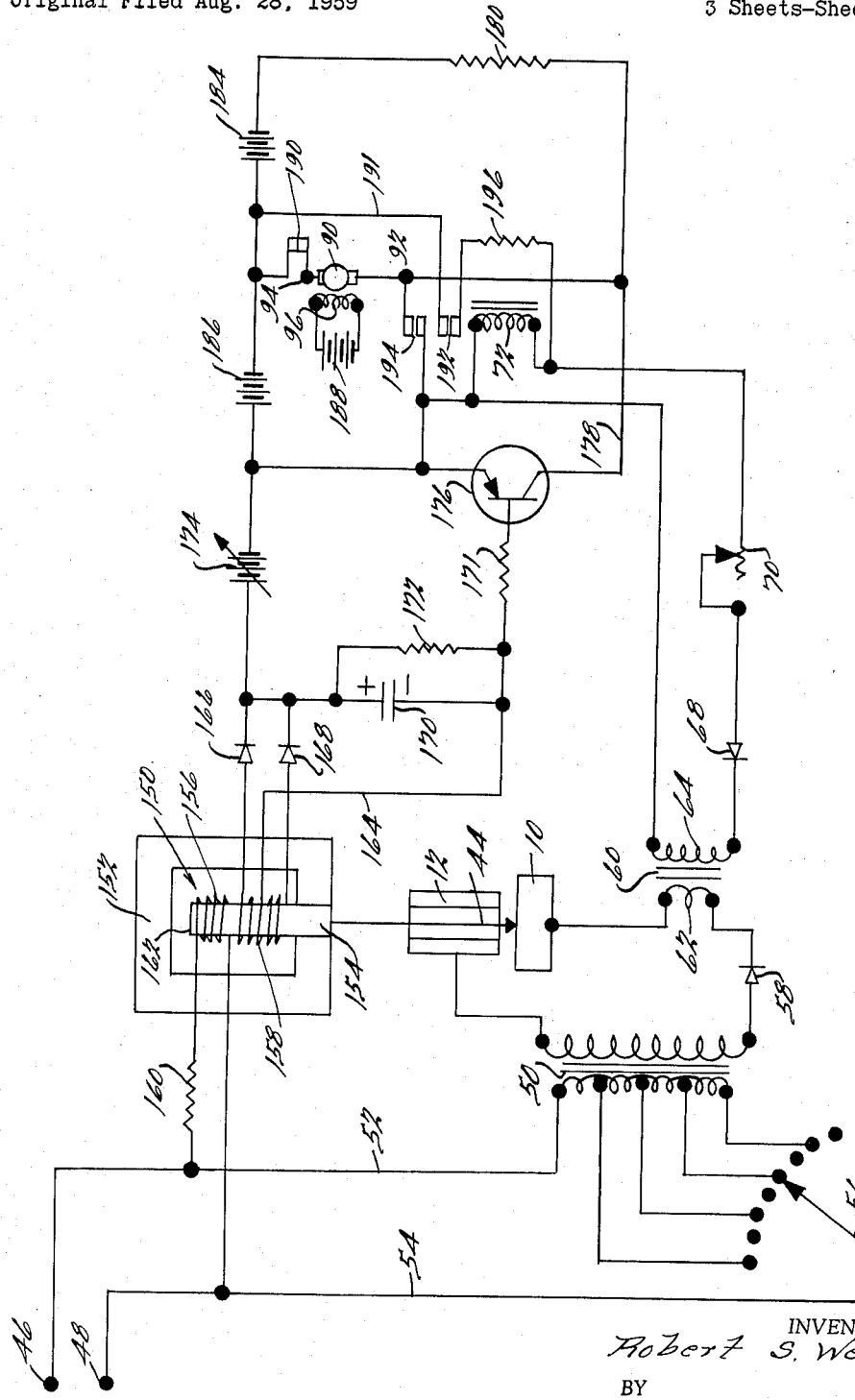

United States Patent Office 3,257,306
Patented June 21, 1966

3,257,306
ELECTROLYTIC MACHINING APPARATUS
Robert S. Webb, Bloomfield Hills, Mich., assignor to Elox Corporation of Michigan, Royal Oak, Mich., a corporation of Michigan
Continuation of application Ser. No. 836,788, Aug. 28, 1959. This application Dec. 12, 1962, Ser. No. 244,859
24 Claims. (Cl. 204—224)

This application is a continuation in my co-pending application No. 836,788, filed on Aug. 28, 1959, now abandoned, entitled "Electrolytic Machining Apparatus."

This invention relates to electro-chemical-machining, sometimes called ECM, and particularly to power feeds for the electrodes of ECM apparatus.

Electro-chemical-machining is carried on by disposing an electrode having the shape of the hole or cavity to be cut in proximate relation to a metallic workpiece, maintaining electrolyte in the gap between the two and passing a unidirectional current through the electrolyte to remove stock from the workpiece by electrolysis. The gap spacing is very small, a few thousandths of an inch, and precise control of the gap length and of the infeeding of the electrode must be had for good results.

Servo type automatic power feeds with control circuits utilizing sensing means for reading voltage or current conditions in the gap, such as are used in electrical-discharge-machining, have been used with some success. However, I have found that in ECM, factors are present which render these power feeds unsatisfactory in many instances. Some of these factors are: variation in electrolyte composition and temperature, variations in working area, etc. These variations render it quite impractical to sense or measure the working gap electrically in many instances.

Accordingly, it is the object of the present invention to provide an improved power feed and control means therefor for ECM equipment which includes means for measuring the gap mechanically and effecting automatic adjustment of the gap spacing by electrical or electro-hydraulic means operable in response to signals received from the mechanical measuring means.

Reference is made to the accompanying drawings and the following specification for a description of preferred embodiments of my invention.

In the drawings, in which reference characters have been used to designate like parts referred to below:

FIG. 1 is a front elevation, partly in section, of a representative ECM set-up;

FIG. 2 is a fragmentary detail of the lower end of the electrode after it has penetrated the workpiece;

FIG. 3 is a section through the electrode taken on line 3—3 of FIG. 1;

FIG. 4 is a sectional detail along line 4—4 of FIG. 1;

FIG. 5 is a schematic view of another form of power feed;

FIG. 7 is a schematic showing of a modified power feed control utilizing a differential transformer.

Figure 6:
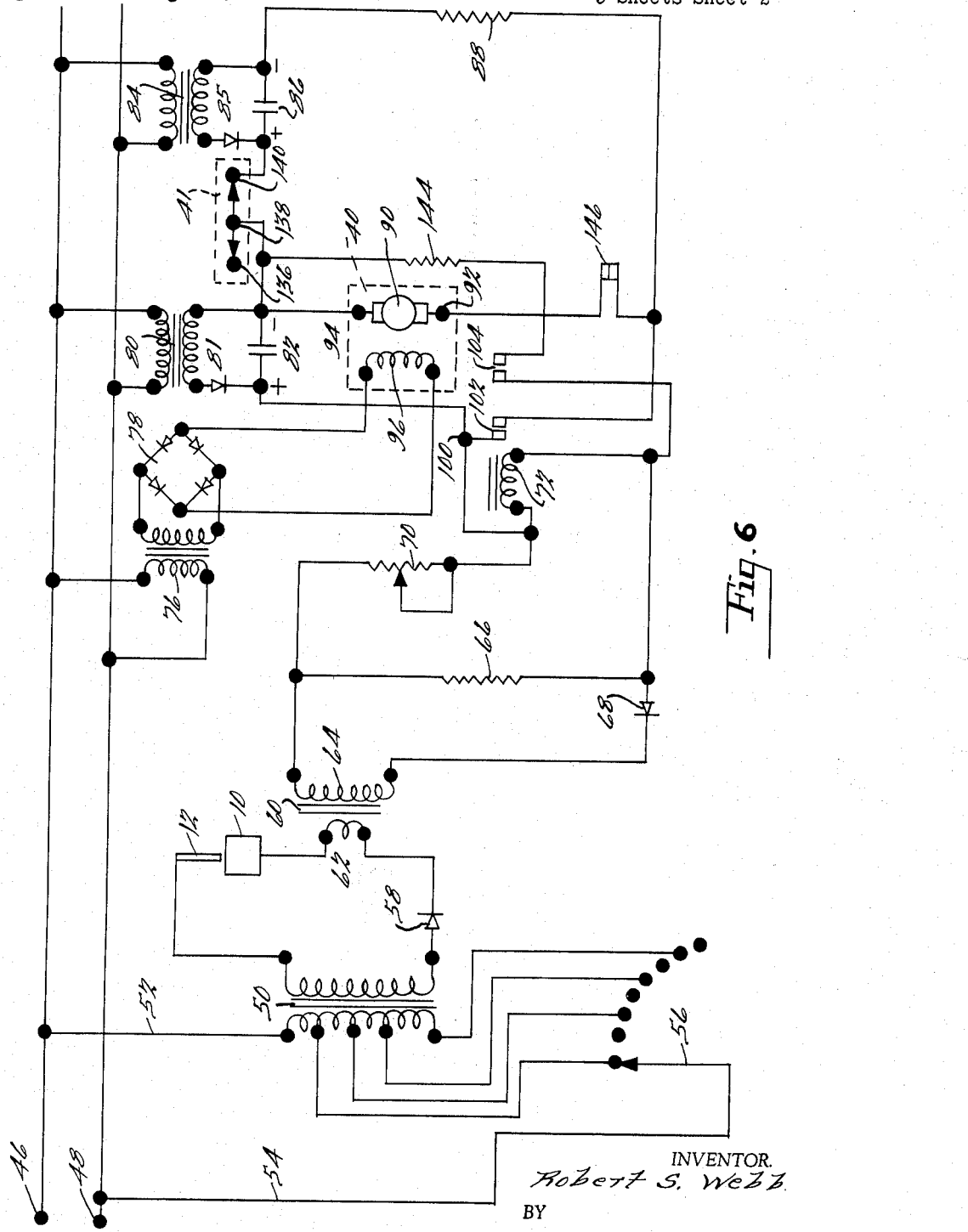
FIG. 6 is a schematic showing of a relay actuated power feed control.

Referring now to FIGS. 1–4 inclusive, it will be seen that I have shown a basic ECM set-up in which a workpiece 10 is being machined by an electrode 12. The workpiece is clamped to a conductive block 14 which is provided with a central opening 16, and the workpiece assembly is contained in a pan 18 which rests on an insulating pad 20.

The electrode 12 may have almost any shape desired in accordance with the shape of the hole or cavity being cut. The pan 18 is partially filled with electrolyte, usually a saturated sodium chloride solution, and the electrolyte is preferably circulated under pressure by a pump and filtering system (not shown). In order to provide positive circulation of electrolyte in the gap zone, passages may be provided in the electrode.

The electrode 12 is (in this example) mounted on a screw 22 by means of a bracket 24 (FIGS. 1 and 4). The screw 22 is drivingly carried by a nut 26 journaled in the arm 28 of the support structure 30. The nut is provided with bevel gear teeth 32 which are meshed with the teeth of bevel gears 34 and 36. The gear 36 is rotatable by handle 38 for the purpose of permitting manual adjustment of electrode height, and gear 34 is mounted on the shaft of an electric motor 40 which, as will be hereinafter explained, functions to automatically and constantly adjust the position of the electrode to maintain optimum gap spacing while feeding the electrode into the work as machining progresses. The electrode feeding means just described is by way of example only, it being understood that other types of gearing and adjusting means could be used.

Also carried by the bracket 24 is a microswitch 41 which has a depending plunger 42. The switch 41 may be one of several available commercially having a spring loaded plunger, the deflection sensitivity of which is preferably between .0005 and .005 inch for switch contact and non-contact.

The electrode 12 has an opening extending through from top to bottom which is disposed a probe 44. The probe is of hard insulating material, preferably glass, and is pointed at its lower end. A typical probe used successfully consists of a glass rod two millimeters in diameter, drawn to a point or a small flat of not more than about .015 inch in diameter. The probe 44 extends freely through the hole in the electrode into contact with the workpiece, and the upper end thereof engages the plunger 42, the spring load of the plunger tending to force the probe downwardly into the workpiece.

The probe is set prior to initiation of the machining operation such that it extends beyond the electrode face by an amount equal to the desired gap spacing with the plunger 42 in such position that the switch 41 is open. It will be understood that the electrode 12 and workpiece 10 are connected to a suitable source of power. The power source will cause a flow of current across the gap from the electrode through the electrolyte to the workpiece, and erosive action will take place.

Referring now to FIG. 6, terminals 46, 48, represent a single phase A.C. supply of suitable voltage. A power transformer 50 has its primary connected across leads 52, 54, a tap switch 56 being interposed in one side of the line to vary excitation of the primary. The secondary of transformer 50 is connected to the workpiece 10 and electrode 12 through a blocking diode 58 to provide a half wave D.C. supply for the machining gap.

A current sensing transformer 60 has its primary 62 connected in series with the gap such that current flowing to the gap will develop a signal on the secondary 64. A resistor 66 is connected across secondary 64 in series with a diode 68 such that flow of current in the secondary circuit will be phased correctly to avoid saturation of the transformer core. Thus transformer 60 is a true current transformer and the signal developed across resistor 66 is directly proportional to current flowing in primary 62.

A relay coil 72 is connected across the resistor 66 through a control rheostat 70, the latter being normally adjusted to cause energization of the coil 72 at the full or peak current capacity of the power supply.

The motor 40 has a field coil 96 which is energized from the main supply busses 46, 48, through a transformer 76 and a full wave rectifier 78. The armature 90 of motor 40 is energized from the same busses through transformers 80, 84, as will be explained. The secondary of transformer 80 is connected in shunt with a condenser 82 through a blocking diode 81 and the secondary of transformer 84 is connected in shunt with a condenser 86 through a diode 85. The condensers 82 and 86 then, for all practical purposes become the voltage sources for the armature 90 with the respective polarities as indicated on the circuit diagram. Current limiting resistors 88 and 144 are connected in the armature circuits, and a limit switch 146 is provided to cut off power to the armature at the upper limit of travel of the electrode holder.

The microswitch 41 has a normally open terminal 136, a common terminal 138 and a normally closed terminal 140, it being understood that this normal condition exists when the switch itself is unloaded. For example, when the probe 44 extends through the electrode with no contact on a workpiece, the switch is in this normal position, and contact is established between common terminal 138 and closed terminal 140.

In such instance, with machine power "on," the voltage across condenser 86 is connected across the armature 90 through limiting resistor 88 such that terminal 92 of the armature is negative with respect to terminal 94, electron flow being in this direction. This provides downfeed of the electrode 12.

When the probe 44 hits the face of the workpiece 10 and the electrode has continued to feed downwardly until the desired working gap is established, the microswitch will be opened to thus break contact between terminals 138, 140. The armature 90 will stop, and a condition of null or hold of the electrode is established.

Erosion of the workpiece 10 by the electrolytic action will cause the probe to move downwardly in the direction urged by the spring in the microswitch, and contact will again be established between switch terminals 138, 140, resulting in downfeed of the electrode to maintain optimum gap spacing.

Due to the extremely high current levels used in electro-chemical machining, instantaneous interruption of the circuit in either the primary or secondary leads of transformer 50 to prevent damage to the workpiece in event of overcurrent would require contactors of prohibitive cost. I provide for this contingency by interrupting the machining cycle through quick backup of the electrode to the full extent of the machine limits. This is accomplished by current sensing transformer 60.

As stated above, rheostat 70 is adjusted to energize relay coil 72 at peak current, or at whatever magnitude of current is set as the value not to be exceeded during machining. In event of a decrease in gap distance below that desired, or contact between the electrode and workpiece, or accumulation of contaminant in the gap area, or other cause of short circuit or equivalent, flow of current in the power circuit will rise.

Rise to preset magnitude will energize coil 72 and close contact sets 102 and 104. Contact set 102 completes a circuit to armature 90 from backup supply 82, such that electron flow is from condenser 82, through terminal 94, armature 90, terminal 92, switch 146, and contact set 102. The armature 90 will instantly rotate to retract electrode 12.

Because contact set 104 is also closed, voltage 82 is applied to relay coil 72 from terminal 100, through coil 72, holding contacts 104, and limiting resistor 144. Thus once the overcurrent relay coil 72 is energized, it is self-held and the motor backup continues irrespective of other actions in the circuit until the limit switch 146 is tripped by mechanical action.

Reference is now made to FIG. 7 for a description of a modified form of feed control wherein a probe is used, but a differential transformer is substituted in place of the microswitch. The power supply, 46 to 56 inclusive, is the same as in FIG. 6.

A differential transformer 150, provided with an iron core 152 and a movable plunger 154 to form a flux path for primary 156 and secondary 158, has the glass probe 44 carried by the plunger as shown schematically. The primary 156 is energized from terminals 46, 48, through a current limiting resistor 160.

Because the probe 44 is carried directly by the movable plunger 154, the air gap 162 of the transformer, and consequently the inductance thereof, will be varied with movement of the probe. As the probe advances into the workpiece in response to removal of stock by electrolytic action, the air gap 162 will increase thus decreasing transformer inductance and causing an increase in magnetization current in pramiry 156, and corresponding decrease in applied voltage because of limiting resistor 160. Similarly, decrease in the length of air gap 162, caused by retraction of probe 44, will cause decrease in magnetization current and increase in applied voltage. These decreases and increases in the voltage on primary 156 cause corresponding variations in the voltage on secondary 158 which constitutes control signal.

It will be seen from the circuit diagram that secondary 158 is center tapped by lead 164 and the ends are connected to rectifiers 166, 168, such that the positive output of secondary 158 is stored in condenser 170, across which a resistor 172 is shunted.

A p-n-p transistor 176 has its base connected to the negative side of network 170, 172, its emitter connected to a bias reference voltage 174 and its collector connected by lead 178 to one side of motor armature 90 and to resistor 180. The latter is connected at its other side to voltage source 184, the latter being in series with a third voltage 186 which, in turn, is connected in series with reference 174. The other side of armature 90 is connected between voltages 184 and 186 through a mechanically operated, normally closed switch 190, which is adapted to be opened when the electrode is withdrawn to its upper limit of movement. The motor field has its own voltage supply 188.

This form of control requires the same type of current transformer 60 as previously described. The secondary 64 is connected to relay coil 72 as shown through diode 68 and rheostat 70, and the latter is adjusted to cause coil 72 to just energize at the point of maximum current rating of transformer 50. At this point of maximum current coil 72 energizes closing contacts 192 and 194. Closure of contacts 194 connects armature 90 across voltage 186. Electron flow is from voltage 186 to terminal 94, armature 90, terminal 92, contacts 194 and back to voltage 186. Corresponding flow in the relay holding circuit is from voltage 186, through lead 191 to contacts 192, resistor 196, coil 72 and back to the positive side of 186, thus holding the coil 72 energized. In such instance, the electrode will retract fully until the upper limit switch 190 is tripped.

The feed operation is as follows:

Let it be assumed that erosion of the work 10 has caused probe 44 to advance through the electrode 12 thus indicating too large gap spacing. Plunger 154 will drop and increase air gap 162 whereupon the voltage across secondary 158 will decrease. As this voltage decreases to a value equal to or below reference voltage 174, a positive voltage will be applied to the base of transistor 176, it being understood that the output of secondary 158 is connected in bucking relationship with voltage 174.

The transistor 176 will then cut off and block conduction. Electron flow then will be from voltage 184 through resistor 180 to terminal 92, and through the armature 90 back to voltage 184. The armature 90 will then rotate to downfeed the electrode. Downfeed will continue until air gap 162 is of such length that the voltage across condenser 170 is just slightly more positive than 174 whereupon electrons will flow from condenser 170 through resistor 171, base to emitter junction of transistor 176, through voltage 174 and back to condenser 170. The transistor 176, being partially conductive, draws sufficient current to cause the voltage drop across resistor 180 to exactly equal source voltage 184. Electron flow through this loop is from 184, through resistor 180, collector-emitter junction of 176, voltage source 186, and back to source 184. Thus there is no flow in the armature circuit and zero feed or null condition results.

Ordinarily, electrode backup is not encountered in operation of this type of feed. However, should the working gap decrease beyond optimum, air gap 162 will correspondingly decrease and increase the voltage across condenser 170. This will render transistor 176 more conductive and cause two currents to flow through the transistor circuit. One will be an increased flow from source 184 through resistor 180, and another will flow from source 186, through terminal 94, armature 90, terminal 92, lead 178, transistor 176 and back to 186. This latter flow will cause backup of the servo-feed until optimum conditions are restored.

Attention is now directed to FIG. 5, which schematically illustrates a power feed mechanism utilizing a hydraulic servo. Hydraulically actuated electrode positioning means has significant advantages in many applications especially when large area, heavy electrodes are used. In this instance, a hydraulic piston 200 is used instead of a motor armature for controlling position of the electrode with respect to the workpiece. The piston is controlled by pressure fluid which is, in turn, regulated by an electrically actuated valve. The valve is controlled by sensing means such as that described above and shown in FIGS. 6 and 7, the terminals 92, 94, in FIG. 5 corresponding exactly to the terminals 92, 94, of the aforesaid figures.

While FIG. 5 shows the microswitch control of FIG. 4 carried by the hydraulic ram, the differential transformer plunger of FIG. 7 could be used just as readily.

The hydraulic mechanism comprises a ram to which piston 200 is fixed. The piston is slidable in cylinder 202. The lower chamber of cylinder 202 is connected to regulating valve 214 by line 212. The upper chamber is similarly connected to the valve by line 216. The valve body is pressurized by pump 218 through line 224, a filter 220, check valve 206, screen 208 and an accumulator 222 being provided in accordance with conventional practice. Line 226 connects the valve to the reservoir 204.

The fluid circuit comprises the reservoir 204 which contains fluid 205. The fluid is drawn through screen 208 through the input suction line by pump 218. The pump, which operates in a range of from 500 to 3000 p.s.i. forces the fluid through check valve 206 and filter 220 to accumulator 222, which stores hydraulic pressure and eliminates surging. Pressure line 224 connects with input port 225 of valve 214. The hydraulic circuit is completed by the valve through the hydraulic cylinder, and any flow of fluid is exhausted by valve exhaust port 227 into line 226.

As seen from FIG. 5, the valve 214 has a pair of energizable coils 232–234. These coils may be connected in series, parallel, or in "push-pull," it being necessary only to correctly phase the coils such that the desired operation is obtained with a reversal of polarity across them. In this instance, the coils are connected in parallel. The valve 234 is a two-stage valve and embodies a sensitive first stage and a second stage which is operable in response to operation of the quickly responsive first stage. In other words, there is hydraulic amplification in the valve itself which causes the relatively low differential pressures developed in the first stage to be amplified in the second stage in such manner that much higher pressures are applied to operation of the piston 200. Such valves are commercially obtainable. A Vickers Model A–13051 or a Pagasus Model 120 G have been found satisfactory. My copending application Serial No. 805,989, filed April 13, 1959, issued on November 29, 1960, as U.S. Patent 2,962,630, shows such a valve in detail.

The coils 232, 234, are controlled by a suitable energizing circuit such as shown in FIGS. 6 or 7. Excitation of coils 232 and 234 in one direction of polarity, for example, will cause the valve 214 to restrict flow through port 229 and open port 231 whereupon greater fluid pressure will be applied in the upper chamber of cylinder 202 and piston 200 will be forced downwardly thus feeding the electrode 12 into the work. Backup and null conditions are achieved in a similar manner as heretofore described, and it is believed that repetition is unnecessary.

I claim:

1. In an electrical machining apparatus for eroding a conductive workpiece by an electrical current, a machining electrode having a face defining an area of erosion on the workpiece, drive means for providing relative movement between said electrode and the workpiece, a probe of insulating material, said probe movable through said face of said electrode and engaging the workpiece in the area of erosion, and means operatively connected to and controlled by the movement of said probe for controlling the operation of said drive means.

2. In an electrical machining apparatus for eroding a conductive workpiece across a gap by an electrical current, a machining electrode having a face defining an area of erosion on the workpiece, drive means for providing relative movement between said electrode and the workpiece, a probe of insulating material extending from and slidable through said face of said electrode, biasing means yieldably maintaining said probe into engagement with the workpiece in the area of erosion, and means operatively connected to and controlled by the movement of said probe for controlling the operation of said drive means.

3. In an electrical machining apparatus for eroding a conductive workpiece by an electrical current, a machining electrode having one end defining an area of erosion on the workpiece, drive means for providing relative movement between said electrode and the workpiece, a probe of insulating material extending from and slidable through said end of said electrode, biasing means yieldably maintaining one end of said probe into engagement with the workpiece in the area of erosion, and switching means having its actuating member in abutment with the other end of said probe for controlling the operation of said drive means.

4. The combination as set forth in claim 3 in which said drive means comprises an electrical motor having a control winding and a source of electrical potential connectable to said winding to provide movement of said electrode toward the workpiece, said switching means of the double throw type having a contact movable between a normally closed and an open contact, said switch operable to open the circuit to said winding responsive to movement of said probe to less than a predetermined distance from the said face of said electrode whereby feed of said electrode is interrupted.

5. The combination as set forth in claim 3 in which said biasing means comprises a spring operatively connected to said probe through said actuating member of said switch.

6. In an electrical machining apparatus for eroding a conductive workpiece by an electrical current, a machining electrode having a face defining an area of erosion on the workpiece, drive means for providing relative movement between said electrode and the workpiece, a probe of insulating material extending from and slidable through said face of said electrode biasing means yieldably maintaining said probe into engagement with the workpiece in the area of erosion, said probe extending through said face of said electrode for a predetermined distance representative of a selected gap between said electrode and the workpiece, and means operatively connected to and controlled by the movement of said probe for controlling the operation of said drive means.

7. The combination as set forth in claim 6 wherein said means for controlling the operation of said drive means comprises a differential transformer having a movable core connected to said probe for providing a variable voltage control signal to said drive means.

8. The combination as set forth in claim 7 in which said differential transformer comprises a primary and a secondary winding mounted about said movable core, said primary winding operable responsive to core movement therethrough to vary the voltage output through said secondary winding to said drive means.

9. The combination as set forth in claim 8 in which said drive means comprises an electrical motor having a control winding operatively connected to the output of said secondary winding.

10. In an electrical machining apparatus for eroding a conductive workpiece by an electrical current, a machining electrode having a face defining an area of erosion on the workpiece, drive means for providing relative movement between said electrode and the workpiece, a probe of insulating material extending from and slidable through said face of said electrode, biasing means yieldably maintaining said probe into engagement with the workpiece in the area of erosion, said probe extending through said face of said electrode a predetermined distance representative of a selected gap between said electrode and the workpiece, and a bidirectional control means operable to activate said drive means to move said electrode toward and away from the workpiece responsive to the displacement of said probe more or less than its predetermined distance from said face of said electrode.

11. The combination as set forth in claim 10 in which said drive means comprises a hydraulic servo motor and an electrically energizable servo valve operatively connected thereto, said servo valve including a pair of coils connected to the output of said control means.

12. In an electrical machining apparatus for eroding a conductive workpiece by an electrical current, a machining electrode having a face defining an area of erosion on the workpiece, drive means for providing relative movement between said electrode and the workpiece, a probe of insulating material slidably mounted in and extending through said face of said electrode, biasing means yieldably maintaining said probe into engagement with the workpiece in the area of erosion, said probe extending through said face of said electrode for a predetermined distance representative of a selected gap between said electrode and the workpiece, a variable inductance mounted on said probe, and means responsive to changes in output voltage of said inductance operably connected to and controlling said drive means.

13. In an electrical machining apparatus for eroding a conductive workpiece across a gap by an electrical current, a machining electrode having one end defining an area of erosion on the workpiece, drive means for providing relative movement between said electrode and the workpiece, a probe of insulating material slidably mounted on said electrode and extending from said end, biasing means yieldably maintaining said probe into engagement with the workpiece in the area of erosion at the initial closest point between said electrode and workpiece, said probe extending through said end of said electrode a predetermined distance representative of a selected gap spacing between said electrode and the workpiece, and control means operatively connected to the other end of said probe and operable to activate said drive means.

14. The combination as set forth in claim 13 in which said control means comprises a differential transformer having a movable core connected to said probe for providing a variable voltage control signal to said drive means.

15. The combination as set forth in claim 14 in which said drive means comprises an electrically controlled motor operatively connected to said electrode including a control winding operatively connected to said transformer.

16. The combination as set forth in claim 15 in which an electronic control means is connected to the output of the secondary of said transformer and operatively connected between said secondary and said control winding of said motor to control the polarity thereacross.

17. The combination as set forth in claim 16 in which said electronic control means is of variable conductivity responsive to variations in voltage output from said secondary and operable to advance and to maintain said electrode in a null position.

18. The combination as set forth in claim 17 in which a source of drive voltage is provided for said control winding and said electronic control means is embodied as a transistor having its control electrode operatively connected to the output of said secondary, said transistor normally non-conductive whereby drive voltage is provided by said source across said winding of a polarity to provide relative advance between said electrode and work, said transistor operable to be rendered conductive responsive to a voltage output of predetermined level from said secondary to its control electrode whereby current flow through said control winding is interrupted and feed is inhibited.

19. The combination as set forth in claim 18 in which a second source of drive voltage is connected across said control winding of opposite polarity to said first mentioned source and, in which, responsive to voltage of a magnitude in excess of said predetermined level, said transistor is rendered relatively more conductive and operable to provide application of a drive voltage from said second source across said control winding of a polarity to provide relative separation of said electrode and workpiece.

20. The combination as set forth in claim 13 in which a current sensing means is included in the gap circuit, said current sensing means operable responsive to current in excess of a predetermined level to provide separation of said electrode and workpiece independent of the operation of said control means.

21. The combination as set forth in claim 2 in which a current sensing means is included in the gap circuit, said current sensing means operable responsive to gap current in excess of a predetermined level to provide separation of said electrode and workpiece independent of the operation of said last-mentioned means.

22. The combination as set forth in claim 2 in which a back-up voltage source is connectable to said drive means, and a relay is connected between said source and said drive means, said current sensing means operable responsive to current in excess of said predetermined level to operate said relay to connect said back-up voltage source to said drive means to provide separation of said electrode and workpiece overriding the action of said last-mentioned means.

23. The combination as set forth in claim 22 in which a set of holding contacts are operatively connected to said relay and a limit switch is included in series with said drive means to cut-off its power responsive to a predetermined separation of said electrode and workpiece.

24. The combination as set forth in claim 20 in which said current sensing means comprises a current sensing transformer.

References Cited by the Examiner

UNITED STATES PATENTS

| | | | |
|---|---|---|---|
| 2,762,946 | 9/1956 | Manchester | 219—69 |
| 2,927,191 | 3/1960 | Matulaitus | 219—69 |
| 2,967,813 | 1/1961 | Lindsay | 204—224 |

JOHN H. MACK, *Primary Examiner.*

R. K. MIHALEK, *Assistant Examiner.*